Nov. 10, 1925.

C. O. BURTON

ANEMOMETER

Filed March 27, 1922    2 Sheets-Sheet 1

1,560,535

Witness:
P. Burkhardt

Inventor:
Carl O. Burton,
By Q. Anthony Usina
atty.

Nov. 10, 1925.
C. O. BURTON
1,560,535
ANEMOMETER
Filed March 27, 1922   2 Sheets-Sheet 2
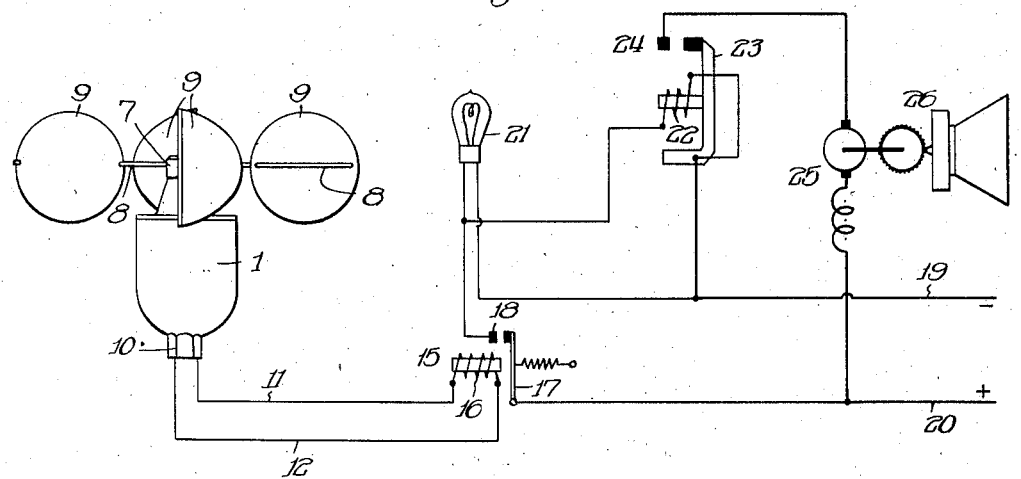
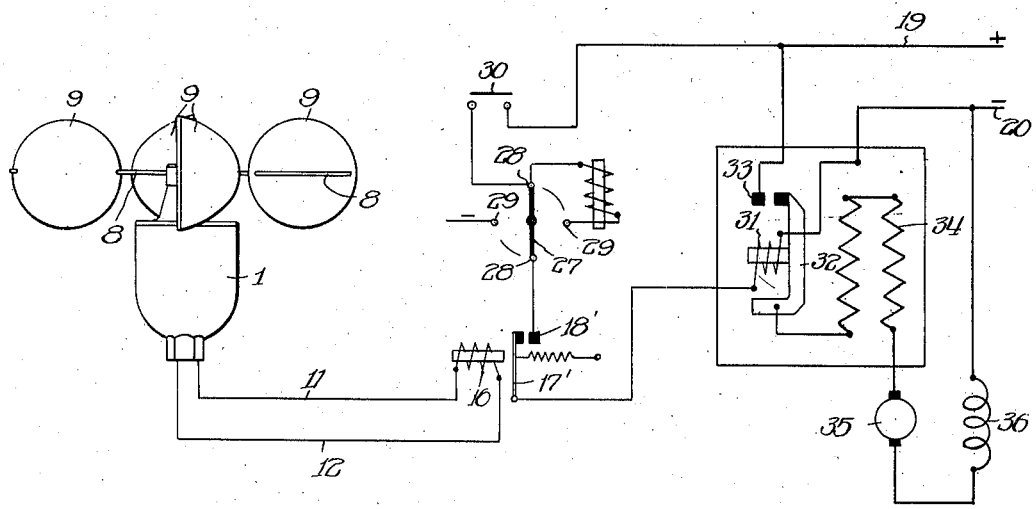
Witness:
R. Burkhardt
Inventor:
Carl O. Burton,
By L. Anthony Usina
Atty Patented Nov. 10, 1925.

1,560,535

UNITED STATES PATENT OFFICE.

CARL O. BURTON, OF DULUTH, MINNESOTA.

ANEMOMETER.

Application filed March 27, 1922. Serial No. 546,982.

*To all whom it may concern:*

Be it known that I, CARL O. BURTON, a citizen of the United States, residing at Duluth, in the county of St. Louis and State of Minnesota, have invented certain new and useful Improvements in Anemometers, of which the following is a specification.

The present invention relates to anemometers.

In determining the velocity of motion of the wind or of moving volumes of gas or air, certain devices variously known as anemometers, air speed meters, air flow meters, etc., are used. As commonly made and used, these devices give the velocity indirectly by means of the time and distance relation. In other words, the indication of such apparatus is actually an average velocity over the period of time involved. The so-called Weather Bureau pattern is of this class. Other less used types measure wind or air velocities by weighing the pressures produced on variously shaped surfaces by their obstruction to free air flow. Still other types measure wind or air velocity by pressure tubes or pressure gauges, which measure the static and dynamic pressures due to the pressure of the free air by Venturi or Pitot tubes. These methods are objectionable for the reason that they are not readily adaptable to the measuring of accurate, instantaneous indications or permanent records of wind or air velocities in such a way as to be commercially useful.

It is of considerable importance in various commercial enterprises to know instantly and accurately the velocities of the wind or of moving volumes of air or gas. Certain types of outdoor cranes, such as coal and ore bridges, unloading towers, gantry and shipyard cranes, present large areas to the wind and may not safely be operated or moved in high winds. Shipping concerns operating steamship lines are usually very much interested in the strength of the wind. The officers on board the ships of such lines are also concerned vitally in questions of wind and weather. Commercial air ports and flying fields require correct information as to the wind conditions prevailing at any time. Airplanes in flight require accurate means of determining the velocity of a plane with respect to the air, for it is only by virtue of considerable forward velocity with respect to the air that they are sustained.

An object of the present invention is to provide an anemometer which will at all times give a correct indication of the relative speed of air or gas with respect thereto.

A further object is to provide an anemometer which will give correct, instantaneous indications, or a record over a considerable period of time, of air or gas velocities.

A further object is to provide an electric anemometer involving a generator which may co-operate with one or a plurality of indicating or recording devices.

A further object is to provide an anemometer mechanism having relay means operative upon an occurrence of predetermined conditions.

A further object is to provide an anemometer mechanism which will operate a signal upon the occurrence of predetermined conditions.

A further object is to provide anemometer mechanism readily adaptable to the control mechanism of a coal or ore bridge whereby said bridge may be locked and prevented from operating whenever the wind velocity reaches a predetermined value.

A further object is to provide simple mechanism whereby anemometer readings may be recorded at a distance from the anemometer and whereby electrical or mechanical operations at a distance may be performed.

Further objects will appear as the description proceeds.

Referring to drawings—

Figure 4 is a diagrammatic showing of anemometer mechanism operative to give a signal upon the occurrence of predetermined conditions;

Figure 5 is a diagrammatic showing illustrating the principles of the present invention in connection with the locking mechanism of a coal or ore bridge.

Figure 1:
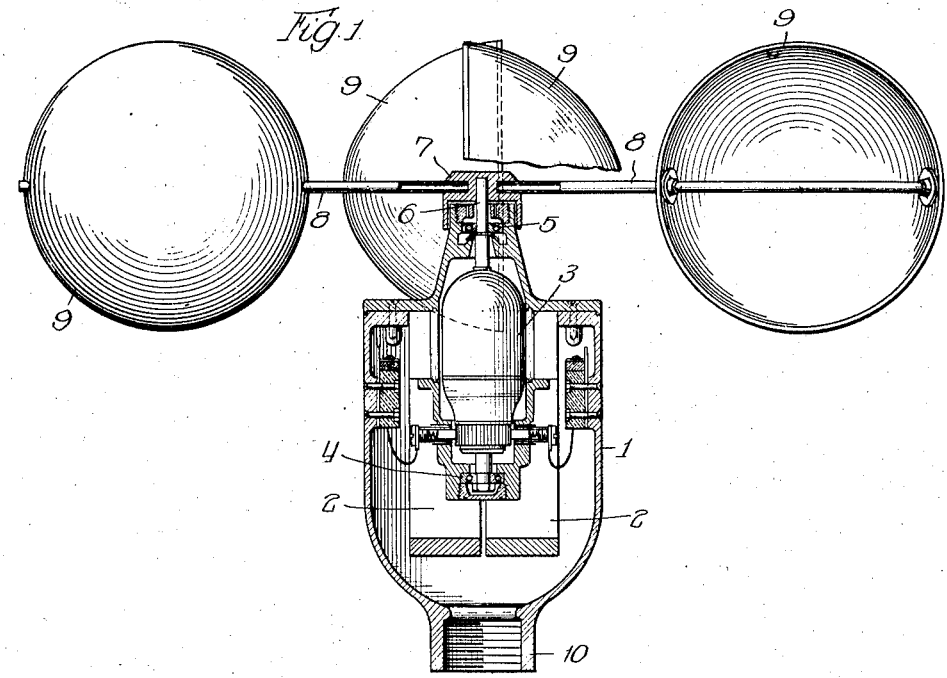
Figure 1 is a view in elevation, with parts broken away, illustrating one embodiment of the present invention.

Referring first to Figure 1, an anemometer is shown having mechanism driven by the wind, the velocity of which is to be measured, together with an electric generator which develops a voltage responsive to the speed of rotation of said mechanism. The numeral 1 indicates the casing for the generator, the field magnets of which are indicated by the numerals 2—2 and the armature of which is indicated by the numeral 3. The details of the construction of the generator need not be discussed, though it may be stated that the rotor of said generator should be mounted to have a minimum of friction, for which purpose the ball bearings 4 and 5 may be provided. The shaft 6 of the rotor 3 is connected to the hub 7 which carries the cup arms 8—8, which carry the spaced cups 9—9, of which four are illustrated in Figure 1 of the drawing. The construction of the cups 9—9 may be the usual construction for anemometers and need not be discussed in detail herein. The casing 1 may be tightly closed to withstand severe weather conditions, whereby the generator will be protected at all times. The lower portion of the casing 1 may be provided with an internally screw-threaded neck 10, whereby the casing 1 may be conveniently mounted upon a conduit (not shown) through which the external leads of the generator may extend.

Figure 2:
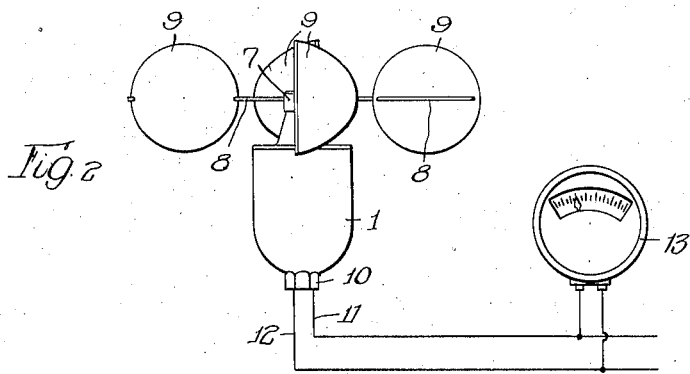
Figure 2 is a diagrammatic showing of anemometer mechanism employing the principles of the present invention.

The external leads of the generator are indicated by the numerals 11 and 12. According to the disclosure of Figure 2, an electric meter 13 is connected across said leads 11 and 12 whereby to be responsive to the voltage developed by said generator. The scale of said meter 13 may be calibrated to indicate the corresponding wind velocities. Inasmuch as the voltage developed by the generator is directly proportional to the speed of the shaft 6 of the rotor of said generator, an accurate determination of wind velocities may be had at all times.

Figure 3:
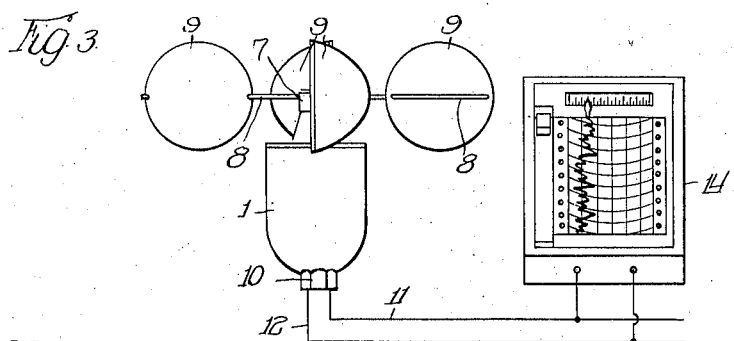
Figure 3 is a diagrammatic showing of anemometer mechanism involving means for recording the wind pressures over a considerable period of time.

According to the disclosure in Figure 3, a recording meter 14 is provided connected across the generator leads 11 and 12. The instrument 14 may be of the type which permanently marks a graphic curve upon a movable sheet, whereby to provide a continuous, permanent record of all changes of anemometer voltage or the corresponding wind velocity.

Figure 4 represents the combination of the anemometer generator with an adjustable relay 15, by means of which a signal may be given upon the occurrence of predetermined anemometer voltage corresponding to a predetermined wind velocity. A solenoid 16 is connected across the generator leads 11 and 12, which solenoid may control the movable switch member 17 which co-operates with the relatively stationary contact 18. Said switch member 17 may be biased by a spring to a position out of engagement with the contact 18. The numerals 19 and 20 represent conductors, which may be connected to a source of electrical energy.

Switch 17 and contact 18 are connected to the conductor 20. A signal lamp 21 is connected across conductors 19 and 20 through the switch members 17 and 18, which signal lamp will be lighted when the voltage developed by the anemometer generator reaches a predetermined value sufficient to develop a magnetic effect in solenoid 16 necessary to close contact 17 on contact 18, which voltage corresponds to a predetermined wind velocity. Also connected across the conductors 19 and 20 through the switch members 17 and 18 is the solenoid 22 which controls the switch member 23. Said switch member 23 is a movable member and may co-operate with a stationary contact 24. Connected across the conductors 19 and 20 through the switch members 23 and 24 is the motor 25 which operates the horn 26. It will be clear that the horn 26 may be replaced by any other type of signal and that said signal may be caused to operate upon the occurrence of any predetermined wind velocity.

According to the disclosure in Figure 5, means are provided responsive to the anemometer generator for locking the wheels of an ore or coal bridge. Bridges of this nature are in the nature of traveling cranes having spaced runways having rails upon which travel the wheels at the two ends of the bridge. In case of high wind velocities unequal stresses may be applied at the two ends of the bridge and the bridge may be blown from the runways. According to the disclosure in Figure 5, the bridge is mechanically locked to the rails upon the occurrence of predetermined wind conditions. The solenoid 16 is connected across the conductors 11 and 12, which solenoid controls the movable switch member 17', which may be biased to a position in engagement with a relatively fixed contact 18'. A limit switch 27 may be provided, which may have two alternative positions, in one of which said switch 27 engages the relatively stationary contacts 28—28 and in the other of which said switch 27 contacts with the relatively stationary contacts 29—29. The details of the limit switch form no part of the present invention and need not be referred to specifically. A pair of electric conductors 19 and 20 are provided which may be connected to a source of electrical energy, conductor 19 being connected through master switch 30 to one of the stationary contacts 28. The other of the stationary contacts 28 is connected to the relatively fixed contact 18'. The movable contact 17' is connected to the electrical conductor 20 through the solenoid 31 which controls the movable switch member 32. Said movable switch member 32 is adapted to engage or disengage the stationary contact 33, which contact 33 may be connected to the electrical conductor 19. The numeral 34 indicates a starting resistance, and numerals 35 and 36 represent the armature and field windings respectively of an electric motor for driving the ore bridge. It will be clear from the drawing that when the movable contact 32 is in engagement with the stationary contact 33 the starting resistance 34, the armature 35 and the field windings 36 will be connected in series across the electrical conductors 19 and 20.

In the embodiment of the invention disclosed in Figure 5, when the velocity of wind reaches a certain predetermined value the solenoid 16 will be sufficiently energized to move switch member 17' out of engagement with contact 18'. Under these conditions the circuit of solenoid 31 is open and the movable contact 32 is out of engagement with the contact 33. The movable contact member 32 may control a rail gripping mechanism, which has not been illustrated and which need not be described in detail for the reason that rail gripping mechanisms for ore bridges are well known and the details thereof form no part of the present invention. It will be sufficient to state that the movable member 32 constitutes an operative part of said rail gripping mechanism. When said contact member 32 is in its open position, as illustrated in Figure 5, the rail gripping mechanism will tightly grip the rail and the coal or ore bridge cannot be moved. This condition will prevail when the wind velocity is at or above a predetermined high value. When the velocity again falls below said predetermined value, energization of solenoid 16 will be sufficiently reduced to permit the closing of contacts 17' and 18', whereby, upon closure of the master switch 30, a circuit is established from the electrical conductor 19 through said master switch, limit switch 27, contact 18', movable contact member 17' and the solenoid 31 to the electrical conductor 20. Energization of the solenoid 31 will result in the engagement of contacts 32 and 33, whereby current may now flow from electrical conductor 19 through the contacts 33 and 32, through the starting resistance 34, armature 35 and field winding 36, to the other electrical conductor 20. The bridge may then be operated, inasmuch as movement of the contact member 32 has released the rail gripping mechanism. The construction illustrated in Figure 5 automatically locks the bridge and prevents same from operation while the wind is dangerously high, but permits the normal operation of said bridge at other times.

The described embodiments of the present invention have been chosen merely for purposes of illustration and should not be considered in a limiting sense. Many modifications will occur to those skilled in the art. It is intended in this patent to cover all such modifications that fall within the scope of the invention as defined by the appended claim.

I claim:

Traveling crane control means, including, in combination, an anemometer device, an electric generator connected to be driven by said anemometer device, the motive mechanism of said crane, rail grip control mechanism, and a unitary relay responsive to the voltage developed by said generator for governing said rail grip control mechanism and said motive mechanism.

Signed at Duluth, Minnesota, this 18th day of March, 1922.

CARL O. BURTON.